(12) United States Patent
Tan et al.

(10) Patent No.: US 12,235,418 B2
(45) Date of Patent: Feb. 25, 2025

(54) TELEPHOTO LENS FOR COMPACT LONG RANGE BARCODE READER

(71) Applicant: ZEBRA TECHNOLOGIES CORPORATION, Lincolnshire, IL (US)

(72) Inventors: Chinh Tan, East Setauket, NY (US); Vladimir Gurevich, Great Neck, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 147 days.

(21) Appl. No.: 17/873,058

(22) Filed: Jul. 25, 2022

(65) Prior Publication Data
US 2023/0067508 A1    Mar. 2, 2023

Related U.S. Application Data (60) Provisional application No. 63/239,348, filed on Aug. 31, 2021.

(51) Int. Cl.
*G02B 13/00* (2006.01)
*G02B 9/34* (2006.01)
(Continued)

(52) U.S. Cl.
CPC ........... *G02B 13/02* (2013.01); *G02B 9/34* (2013.01); *G02B 13/18* (2013.01); *G06K 7/10831* (2013.01); *G06K 7/1413* (2013.01)

(58) Field of Classification Search
CPC .... G02B 13/02; G02B 13/18; G02B 27/0025; G02B 27/005; G06K 7/10831; G06K 7/1404
(Continued)

(56) References Cited

U.S. PATENT DOCUMENTS 5,148,314 A * 9/1992 Chen .................... G02B 5/1876
359/797
6,804,066 B1 * 10/2004 Ha ........................ G02B 5/1814
359/683
(Continued)

FOREIGN PATENT DOCUMENTS

DE      112018005480 B4    5/2021

OTHER PUBLICATIONS

International Search Report and Written Opinion for International Application No. PCT/US2022/41974 mailed on Nov. 29, 2022.

*Primary Examiner* — Paultep Savusdiphol
(74) *Attorney, Agent, or Firm* — Yuri Astvatsaturov (57) ABSTRACT

An imaging engine including a telephoto lens for compact long range barcode readers is disclosed herein. An example imaging engine includes an imaging sensor and a telephoto lens assembly. The example telephoto lens assembly includes a first lens, disposed along an optical axis; a second lens, disposed along the optical axis to correct for pupil aberrations of the image projected after a fourth lens onto the imaging sensor; a third lens, disposed along the optical axis to correct for chromatic aberration of the image projected after the fourth lens onto the imaging sensor; and the fourth lens, disposed along the optical axis to correct for optical field curvature of the image projected after the fourth lens onto the imaging sensor.

20 Claims, 5 Drawing Sheets

(51) Int. Cl.
*G02B 13/02* (2006.01)
*G02B 13/18* (2006.01)
*G06K 7/10* (2006.01)
*G06K 7/14* (2006.01)

(58) Field of Classification Search
USPC .......................... 235/462.01, 462.22, 462.24
See application file for complete search history.

(56) References Cited

U.S. PATENT DOCUMENTS

| | | | |
|---|---|---|---|
| 9,465,988 | B1 | 10/2016 | Marason et al. |
| 9,639,729 | B2 | 5/2017 | Chen et al. |
| 10,599,896 | B1 | 3/2020 | Vinogradov |
| 2009/0161228 | A1 | 6/2009 | Lee |
| 2009/0321618 | A1 | 12/2009 | Ohara et al. |
| 2012/0092779 | A1* | 4/2012 | Maetaki ................. G02B 13/02 359/716 |
| 2012/0307036 | A1* | 12/2012 | Yamamoto ........... G02B 21/025 348/79 |
| 2013/0128084 | A1* | 5/2013 | Vinogradov ....... G02B 13/0035 348/340 |
| 2014/0336848 | A1* | 11/2014 | Saund ................... G06V 20/13 701/3 |
| 2017/0351061 | A1* | 12/2017 | Chang ................. G02B 13/004 |
| 2019/0025849 | A1* | 1/2019 | Dean ........................ G03B 3/06 |
| 2022/0066126 | A1 | 3/2022 | Vinogradov et al. |

* cited by examiner

TELEPHOTO LENS FOR COMPACT LONG RANGE BARCODE READER

CROSS-REFERENCE TO RELATED APPLICATION

This application claims priority to Provisional U.S. Patent Application Ser. No. 63/239,348, filed on Aug. 31, 2021, which is incorporated herein by reference in its entirety.

BACKGROUND

Imaging devices generally capture images within a given field of view (FOV). It is often required that the scanning devices capture images at various distances and at various fields of view to effectively decode information in an image for use in a barcode reader. Additionally, the demand for portable sensors is increasing, which requires the use of smaller sensors and smaller imaging lenses. Accordingly, portable scanning devices must be capable of functioning with various widths and fields of view while generating sharp images over a working range for barcode readers.

Accordingly, there is a need for improved systems, methods, and devices which address these issues.

SUMMARY

In an embodiment, the present invention is an imaging engine for decoding barcodes, the imaging engine comprising an imaging sensor (i.e., an imager) and a telephoto lens assembly for long range imaging of a barcode via the imaging engine. The telephoto lens assembly includes: a first lens, disposed along an optical axis to receive light from an object of interest; a second lens, disposed along the optical axis to receive light from the first lens and further to correct for pupil aberration of the image projected after a fourth lens onto the imager; a third lens, disposed along the optical axis to receive light from the second lens and further to correct for chromatic aberration of the image projected after the fourth lens onto the imager, wherein the chromatic aberration is introduced by the first lens; and the fourth lens, disposed along the optical axis to receive light from the third lens and further to correct for optical field curvature of the image projected after the fourth lens onto the imager.

In a variation of this embodiment, the first lens and the third lens are singlet glass lenses and the second lens and the fourth lens are singlet plastic lenses.

In another variation of this embodiment, the first lens is formed of a Crown type glass having positive optical power and the third lens is formed of a Flint type glass having negative optical power.

In yet another variation of this embodiment, the second lens is a Flint type plastic lens, the fourth lens is a Crown type plastic lens, and the second lens and the fourth lens are aspheric lenses. Further, the second lens has a first aspheric surface along the optical axis and a second aspheric surface opposite the first aspheric surface disposed along the optical axis, and the fourth lens has a first aspheric surface along the optical axis and a second aspheric surface opposite the first aspheric surface disposed along the optical axis.

In still yet another variation of this embodiment, the telephoto lens assembly further comprises an aperture stop disposed along the optical axis and between the first lens and the second lens.

In another variation of this embodiment, the telephoto lens assembly further comprises a light collecting aperture disposed along the optical axis of at least 1.5 millimeters.

In yet another variation of this embodiment, the telephoto lens assembly has an effective focal length (EFL) of at least 11 millimeters.

In still yet another variation of this embodiment, the total length from the first lens to the imager is less than or equal to 11 millimeters, and each of the first lens, the second lens, the third lens, and the fourth lens has a central thickness of at least 1 millimeter.

In another variation of this embodiment, the telephoto lens assembly is mounted on a robotic arm with multiple degrees of freedom.

In yet another variation of this embodiment, the telephoto lens assembly is configured so as to avoid contact between the fourth lens and the imager.

In another embodiment, the present invention is an imaging engine for decoding barcodes, the imaging engine comprising an imager and a telephoto lens assembly for long range imaging of a barcode via the imaging engine. The telephoto lens assembly includes: a first lens, disposed along an optical axis to receive light from an object of interest; a second lens, disposed along the optical axis to receive light from the first lens and further to correct for pupil aberration of the image projected after a fourth lens onto the imager; a third lens, disposed along the optical axis to receive light from the second lens and further to correct for chromatic aberration of the image projected after the fourth lens onto the imager, wherein the chromatic aberration is introduced by the first lens; and the fourth lens, disposed along the optical axis to receive light from the third lens and further to correct for optical field curvature of the image projected after the fourth lens onto the imager; wherein no elements that modify the light wavefront are disposed between any of the first lens and the second lens, the second lens and the third lens, or the third lens and the fourth lens.

In a variation of this embodiment, the first lens and the third lens are singlet glass lenses and the second lens and the fourth lens are singlet plastic lenses.

In another variation of this embodiment, the first lens is formed of a Crown type glass having positive optical power and the third lens is formed of a Flint type glass having negative optical power.

In yet another variation of this embodiment, the second lens is a Flint type plastic lens, the fourth lens is a Crown type plastic lens, and the second lens and the fourth lens are aspheric lenses. Further, the second lens has a first aspheric surface along the optical axis and a second aspheric surface opposite the first aspheric surface disposed along the optical axis, and the fourth lens has a first aspheric surface along the optical axis and a second aspheric surface opposite the first aspheric surface disposed along the optical axis.

In still yet another variation of this embodiment, the telephoto lens assembly further comprises an aperture stop disposed along the optical axis and between the first lens and the second lens.

In another variation of this embodiment, the telephoto lens assembly further comprises a light collecting aperture disposed along the optical axis of at least 1.5 millimeters.

In yet another variation of this embodiment, the telephoto lens assembly has an effective focal length (EFL) of at least 11 millimeters.

In still yet another variation of this embodiment, the total length from the first lens to the imager is less than or equal to 11 millimeters, and each of the first lens, the second lens, the third lens, and the fourth lens has a central thickness of at least 1 millimeter.

In another variation of this embodiment, the telephoto lens assembly is mounted on a robotic arm with multiple degrees of freedom.

In yet another variation of this embodiment, the telephoto lens assembly is configured so as to avoid contact between the fourth lens and the imager.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In creating compact long-range imaging engines for barcode readers, a small field of view (FOV) and a long effective focal length (EFL) is generally desirable. As such, it is further desirable for compact long-range imaging engines to employ similarly compact telephoto lens assemblies. For example, a compact barcode reader may be cube-like, with side lengths of approximately 0.63 inches or 16 millimeters each. Therefore, some compact barcode readers may require long-range imaging engines shorter than 16 millimeters and that utilize a similarly compact telephoto lens assembly. The current disclosure describes a long-range imaging engine that employs four lenses and an imaging sensor that improves upon current technologies by: (i) improving the effective focal length and, as such, long-range imaging capabilities for a compact barcode reader; (ii) reducing the size and cost of imaging engines for barcode engines; and (iii) improving the correction of optical aberrations of images taken by a compact barcode reader.

In an exemplary implementation, the present application provides an imaging engine for decoding barcodes. The imaging engine comprises an imaging sensor (i.e., imager) and a telephoto lens assembly for long range imaging of a barcode via the imaging engine. In various embodiments, the telephoto lens assembly includes a first lens, a second lens, a third lens, and a fourth lens disposed along an optical axis. The first lens is disposed along an optical axis to receive light from an object of interest. The second lens is disposed along the optical axis to receive light from the first lens and further to correct for pupil aberration of the image projected after a fourth lens onto the imager. The third lens is disposed along the optical axis to receive light from the second lens and further to correct for chromatic aberration of the image projected after the fourth lens onto the imager. In some embodiments, the first lens introduces the chromatic aberration that the third lens corrects. The fourth lens is disposed along the optical axis to receive light from the third lens and further to correct for optical field curvature of the image projected after the fourth lens onto the imager.

The telephoto lens assembly of the current disclosure provides a number of improvements over a traditional telephoto assembly. A traditional telephoto assembly is comprised of a positive doublet front lens and a negative doublet back lens, separated by a large air gap. The space between the lenses contributes to the telephoto ratio and generally causes the traditional telephoto assembly to have a total length in the range of 6 to 12 inches with an EFL of 300 millimeters or more. As such, the traditional telephoto assembly cannot fit into a barcode engine as described above. Similarly, attempting to sufficiently scale the traditional telephoto assembly would make the individual lens elements too thin for present manufacturing capabilities. As such, it will be appreciated that the telephoto lens assembly and the imaging engine device of the present disclosure allow for greater reduction in size while maintaining sufficient EFL when compared to traditional techniques.

Figure 1:
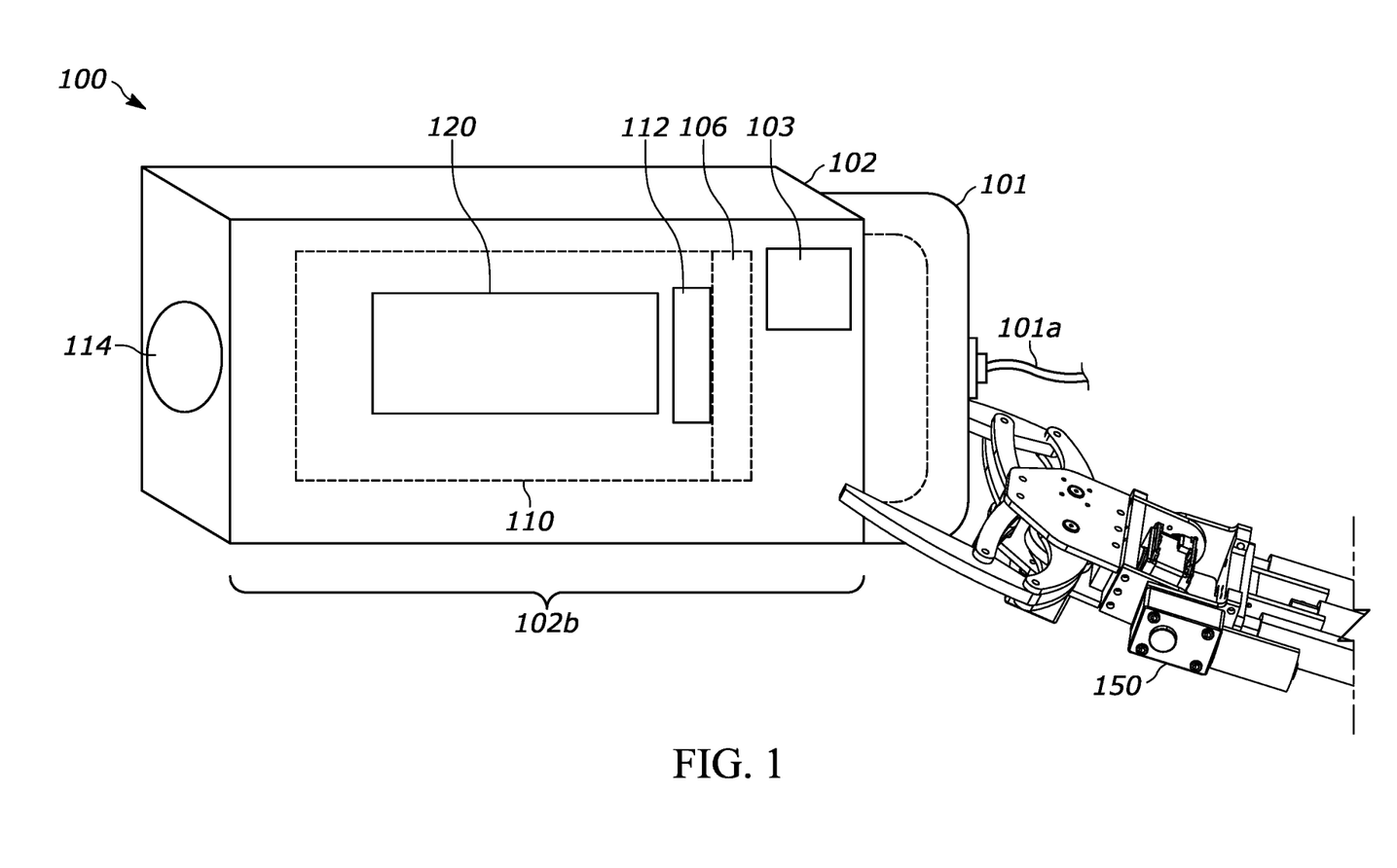
FIG. 1 illustrates a schematic side view of an imaging engine having a telephoto lens assembly in accordance with some embodiments.

Referring first to FIG. 1, a first implementation of an imaging engine device is shown schematically. The imaging engine device 100 includes a housing 102 and an imaging system 110 that is at least partially disposed within the housing 102 that includes an imaging camera assembly. In particular, the imaging system 110 includes an imaging sensor 112 and a telephoto lens assembly 120. The device 100 may be adapted to be inserted into a docking station 101 which, in some examples, may include an AC power source 101a to provide power for the device 100. The device 100 may further include an onboard power supply 103, such as a battery and a printed circuit board (PCB) 106 that may accommodate a memory and a controller that controls operation of the imaging system 110. In embodiments, the device 100 may include a trigger (not shown in the illustration) is used to activate the imaging system 110 to capture an image. The device 100 may include any number of additional components such as decoding systems, processors, and/or circuitry coupled to the circuit board 106 to assist in operation of the device 100.

In some implementations, the device 100 or a portion of the device 100 (such as the imaging system 110) is attached to a robotic and/or mechanical arm 150 with multiple degrees of freedom. Depending on the implementation, the robotic and/or mechanical arm 150 may be configured to minimize jolting or jostling movement that may cause components of the telephoto lens assembly 120 to come into physical contact with other components of the assembly 120 or other portions of the device 100, such as the imager 112. In other implementations, the housing 102 is designed so as to cradle the telephoto lens assembly 120, such as by using fixed or adjustable lens holders, thus allowing for more freedom of movement in the robotic and/or mechanical arm 150. The robotic and/or mechanical arm 150 may be communicatively connected to an outside computing device capable of directing the arm 150. In other implementations, an operator manually controls the robotic and/or mechanical arm 150.

The housing 102 includes a forward or reading head portion 102b, which supports the imaging system 110 within an interior region of the housing 102. The imaging system 110 may, but does not have to, be modular as it may be removed or inserted as a unit into the devices, allowing the ready substitution of imaging systems 110 having different imaging characteristics (e.g., camera assemblies having different focal distances, working ranges, and FOVs) for use in different devices and systems. In some examples, the field of view may be static.

The imaging sensor 112 may have multiple photosensitive elements forming a substantially flat surface. And may be fixedly mounted relative to the housing 102 using any number of components and/or approaches. The imaging sensor 112 further has a defined central imaging axis, A (see FIG. 3), that is normal to the substantially flat surface. In some implementations, the imaging axis A is coaxial with a central axis of the lens assembly 120. The lens assembly 120 may also be fixedly mounted relative to the housing 102 using any number of components and/or approaches. In the illustrated embodiment, the lens assembly 120 is positioned between a front aperture 114 and the imaging sensor 112. The front aperture 114 blocks light from objects outside of the field of view, which reduces imaging problems due to stray light from objects other than the target object. Additionally, the front aperture 114 in conjunction with one or more lenses allows for the image to form correctly on the imaging sensor 112. In some implementations, the front aperture 114 is circular and has a diameter of 2.0 millimeters. In further implementations, the front aperture 114 has a diameter in the range of 1.5 millimeters to 4.0 millimeters.

In some embodiments, the housing 102 may include additional elements such as an illumination system configured to illuminate a target object for imaging. The illumination system may include a light emitting diode, laser diode, black body radiation source, or another illumination source. Additionally, the illumination system may include optics for dispersing or focusing optical radiation for illumination of the target object. The illumination system may be housed inside of the housing 102, may attach to the external surfaces of the housing 102, or may be a separate device or component configured to illuminate the target object for capturing an image by the imaging engine device 100. Further, the housing 102 may include an aiming system communicatively coupled to the illumination system. The aiming system may direct the illumination system to illuminate a target object for imaging. Depending on the implementation, the aiming system may automatically detect the presence of an object of interest, designate the object of interest as a target object, and focus the illumination system to illuminate the target object. Similarly to the illumination system, the aiming system may be housed inside of the housing 102, may attach to the external surfaces of the housing 102, or may be a separate device or component configured to direct the illumination system.

Depending on the implementation, the imaging engine device 100 may be implemented in a barcode reader as described in FIGS. 4 and 5 below. In such implementations, the housing 102 may be a housing of a barcode reader. Similarly, the docking station 101 may be a docking station for a barcode reader or may be a docking station in the barcode reader itself. As such, though the exemplary embodiment illustrated in FIG. 1 shows one potential design, it will be understood that further designs and devices in which the imaging engine device 100 may be implemented are also disclosed herein.

As described above, prior techniques use two doublet lenses with space between the lenses to create a telephoto lens. However, doublet lenses sufficient for long EFLs are bulky. As such, as illustrated in the exemplary embodiments of FIGS. 2 and 3, each of the first and third lenses may be singlet lenses. However, using singlet lenses to achieve a long EFL in short length may introduce other problems, such as poor imaging quality. To address these problems, the telephoto lens assembly may be built as specified in FIGS. 2 and 3 below.

Figure 2:
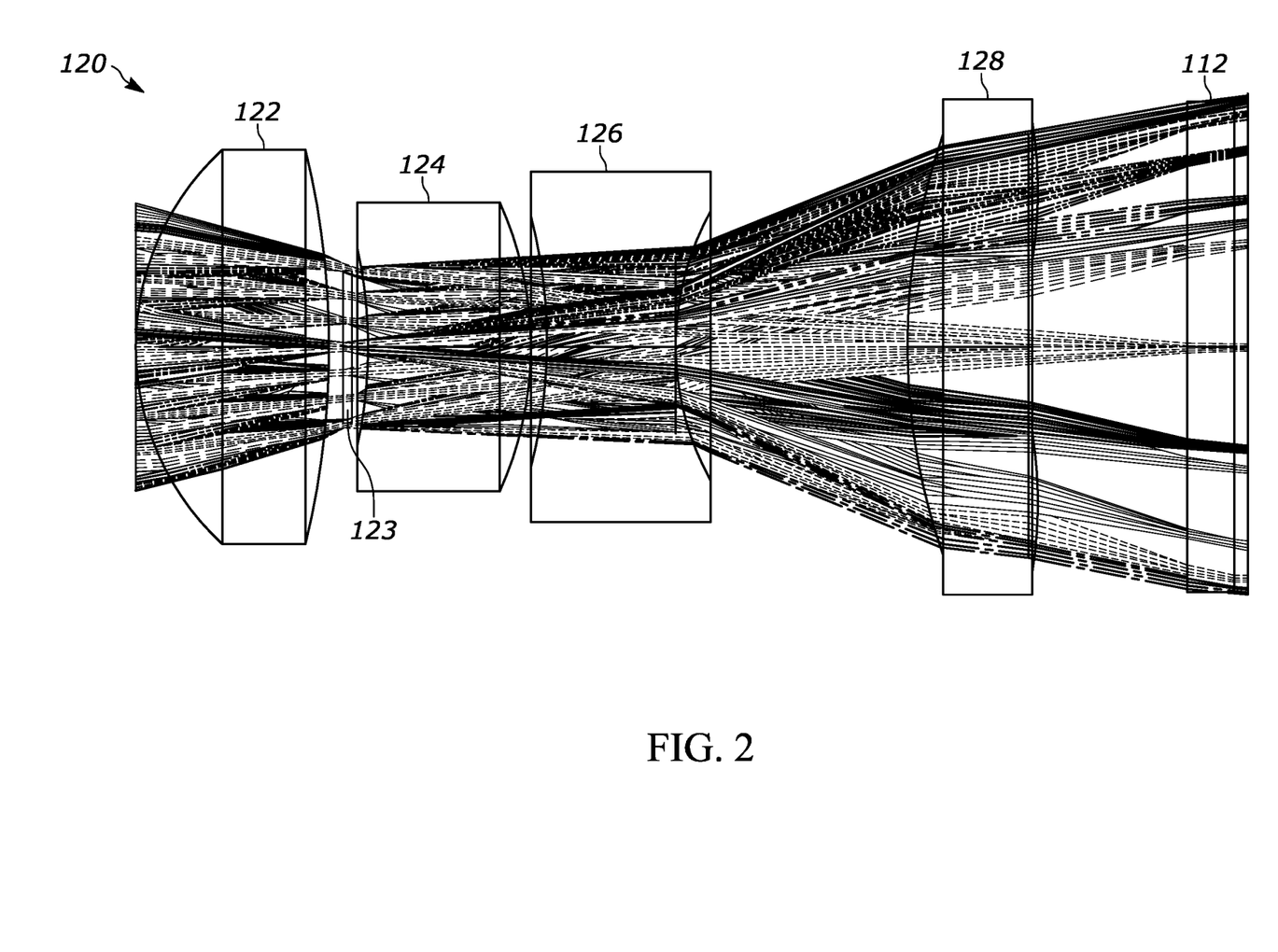
FIG. 2 illustrates a schematic side view of a telephoto lens assembly including four lenses and an imager in accordance with some embodiments.
Figure 3:
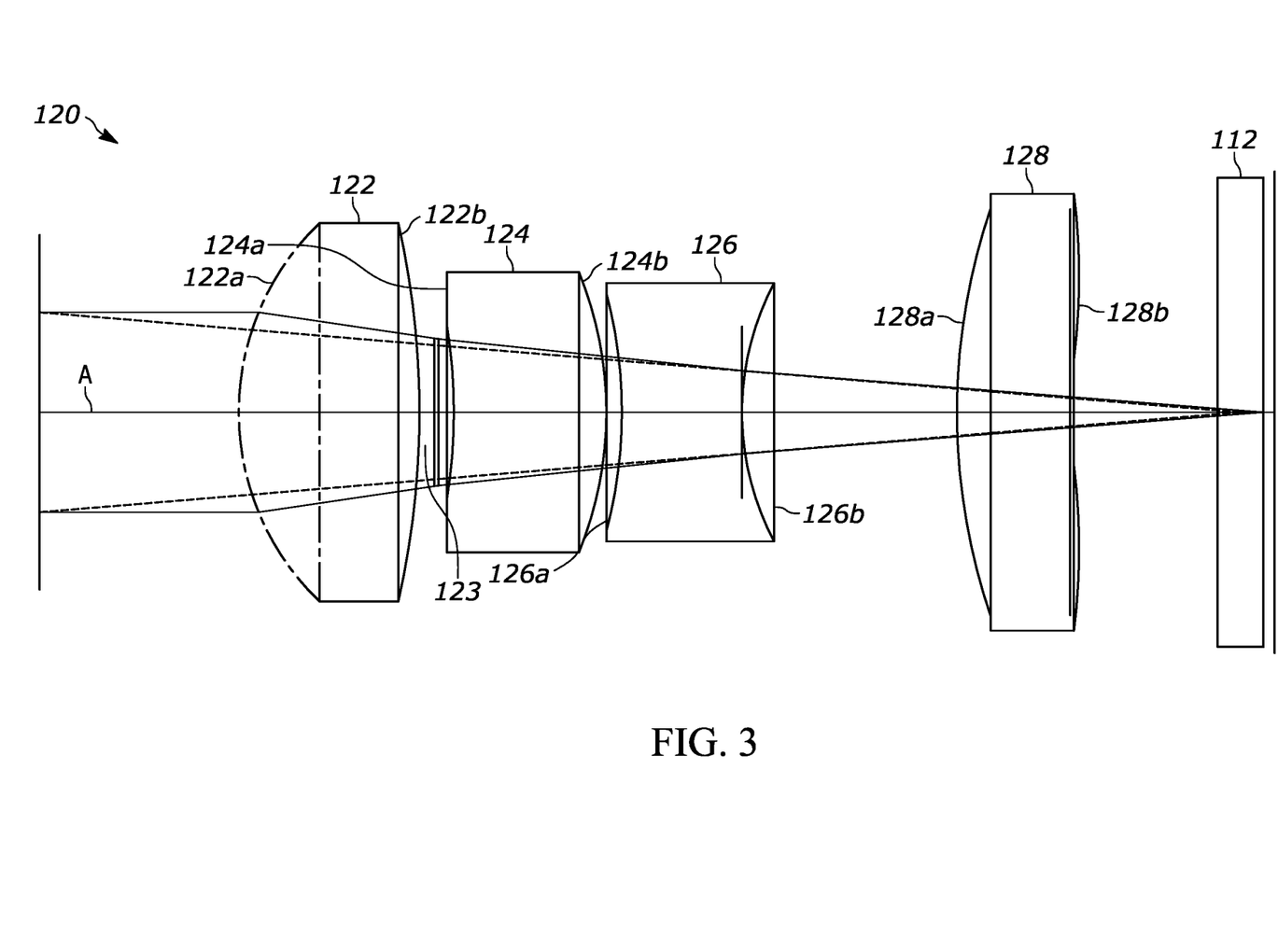
FIG. 3 illustrates a schematic side view of a telephoto lens assembly with an effective focal length longer than the total length in accordance with some embodiments.

Referring next to FIGS. 2 and 3, the telephoto lens assembly 120 includes a number of optical elements disposed along an optical axis. In particular, the lens assembly 120 includes a first lens 122, a second lens 124, a third lens 126, and a fourth lens 128. In some implementations, the lens assembly 120 further includes an aperture stop 123. The first lens 122 is a glass lens and receives light from the environment and the object of interest. Moreover, the first lens 122 has a first surface 122a and a second surface 122b. In some implementations, the first lens 122 is disposed along the optical axis such that the first surface 122a receives light from the environment and the object of interest. The first lens 122 is further made from a Crown type glass with an index of refraction in the range of approximately 1.51-1.62, for example 1.52. In further implementations, the first lens 122 has an Abbe value of approximately 59. The first lens 122 has a positive optical power.

The third lens 126 is also a glass lens and receives light from the environment and the object of interest via the first lens 122 and the second lens 124. The third lens has a first surface 126a and a second surface 126b. In some implementations, the third lens 126 is disposed along the optical axis such that the first surface 126a receives light from the second lens 124. The third lens is made from a Flint type glass with an index of refraction in the range of approximately 1.57-1.75, for example 1.66. In further implementations, the third lens 126 has an Abbe value of approximately 24. The third lens 126 has a negative optical power and corrects chromatic aberration over the blue light to red light range (i.e., a range of approximately 380 nm to 700 nm) introduced by the first lens 122. The first lens 122 and the third lens 126 provide the telephoto ratio for the telephoto lens assembly. Further, the first lens 122 and the third lens 126 in conjunction have stable thermal properties. Notably, in the exemplary embodiment of FIG. 2, the focus shift of the telephoto lens assembly is approximately 20 microns from −30° C. to 70° C. Similarly, the on-axis chromatic focus difference over the range is also approximately 20 microns.

In some implementations, to address potential poor imaging quality achieved by two singlet lenses, the second lens 124 is disposed between the first lens 122 and third lens 126. The second lens 124 is a plastic aspheric lens with a first aspheric surface 124a and a second aspheric surface 124b, and the second lens 124 is further disposed along the optical axis such that the second lens 124 receives light from the first lens 122. In some implementations, the second lens 124 is disposed along the optical axis such that the first aspheric surface 124a receives light from the first lens 122 and/or the aperture stop 123. Depending on the implementation, the second lens 124 may be made from either glass or plastic. In the exemplary embodiment of FIG. 2, the second lens 124 is made from plastic. In particular, the second lens 124 in the exemplary embodiment of FIG. 2 is made from a Flint type plastic. In some implementations, the second lens 124 has an index of refraction of approximately 1.65 and an Abbe value of approximately 22.

As noted above, in some implementations, the second lens 124 is a plastic aspheric lens disposed between the first lens 122 and third lens 126. In some implementations, the second lens 124 corrects for pupil aberrations, such as spherical aberration of the pupil, comatic aberration (e.g. coma) of the pupil, and other similar pupil aberrations. In some implementations, the second lens 124 corrects for spherical aberration of the pupil via the aspheric shape of the second lens 124. In further implementations, the aspheric shape of the second lens 124 may also correct for coma of the pupil. In other implementations, the curvature of the first lens 122 may be chosen so as to preemptively correct for coma of the pupil and the second lens 124 only corrects for spherical aberration.

The fourth lens 128 is disposed between the third lens 126 and imager 112. The fourth lens 128 is a plastic aspheric lens with a first aspheric surface 128a and a second aspheric surface 128b, and the fourth lens 128 is further disposed along the optical axis such that the fourth lens 128 receives light from the third lens 126. In some implementations, the fourth lens 128a is disposed along the optical axis such that the first aspheric surface 128a receives light from the third lens 126. Depending on the implementation, the fourth lens 128 may be made from either glass or plastic. In the exemplary embodiment of FIG. 2, the fourth lens 128 is made from plastic. In particular, the fourth lens 128 in the exemplary embodiment of FIG. 2 is made from a Crown type plastic. Further, the fourth lens 128 in the exemplary embodiment of FIG. 2 may correct for chromatic aberration introduced by the second lens 124. In some implementations, the fourth lens 128 has an index of refraction of approximately 1.53 and an Abbe value of approximately 56.

In some implementations, the fourth lens 128 corrects for field curvature of the image of the object of interest as projected onto the imager 112. In such implementations, the fourth lens 128 is aspheric and disposed closely to the imager 112. The fourth lens 128, then, maintains focus across the entire FOV of the imager 112, e.g., across any focal plane of the FOV from the nearest focal plane to the furthest focal plane to be imaged. In further implementations, the fourth lens 128 is designed and disposed along the optical axis so as to direct light rays to match the chief ray angle of the sensor. Similarly, the fourth lens 128 may correct for off-axis aberrations such as comatic aberration In some implementations, an aperture 123 may be disposed along the optical axis between the first lens 122 and the second lens 124. The first lens 122 is disposed in close proximity to the aperture 123 to prevent stray light from reaching the imager 112. In further implementations, the aperture 123 may be a permanent piece of the housing 102 or the imaging system 110, such as a front or back aperture of a lens holder built into the housing 102 or the imaging system 110. In other implementations, the aperture 123 may be physically independent of the housing 102 or the imaging system 110 and/or a separate component, such as a removable or adjustable stop. The aperture 123 defines the aperture stop of the telephoto lens assembly 120. In some embodiments, the aperture 123 is a circular aperture with a diameter of approximately 1.4 millimeters. In further embodiments, the aperture 123 may have a diameter ranging from approximately 0.8 millimeters to 2.0 millimeters.

In some implementations, there are no elements that modify the light wavefront in between any of the first lens 122, the second lens 124, the third lens 126, or the fourth lens 128. In such implementations, the telephoto lens assembly 120 may include elements such as apertures (e.g., aperture 123), but not elements that are refractive, reflective, diffractive, birefringent, or index gradient such as lenses, mirrors, etc. As such, in such implementations, the telephoto lens assembly 120 remains compact while still incorporating the four lenses as described above and any non-optical or non-reflecting and/or refracting optical elements, such as apertures of lens holders.

In some implementations, each of the first lens 122, second lens 124, third lens 126, and fourth lens 128 consist of single elements, and are thus singlet lenses rather than doublet lenses. In such embodiments, the width of each lens is still at least 1 millimeter. However, the total length of the telephoto lens assembly 120 and the imaging sensor 112 is still less than 11 millimeters from the first lens 122 to the imaging sensor 112. In the particular embodiment of FIG. 3, the total length is 10.34 millimeters. Similarly, the effective focal length of the telephoto lens assembly 120, or the distance from the imaging sensor 112 to the point of focus for the assembly 120, is greater than 11 millimeters, meaning that the telephoto ratio is less than 1. In some implementations, the telephoto ratio is less than 0.9. In the exemplary embodiment of FIG. 3, the EFL is 11.8 millimeters from the imaging sensor 112, making the telephoto ratio 0.876. Further in the exemplary embodiment of FIG. 3, the lens has a 19-degree FOV when used with a ¼ inch imaging sensor, has a 2 millimeters aperture, and is thermally stable, color corrected, and diffraction limited.

In some implementations, the imaging sensor 112 may be a charge coupled device, or another solid-state imaging device. The imaging sensor 112 may be a one megapixel sensor with pixels of approximately three microns in size. In further implementations, the imaging sensor 112 includes 3 millimeter pixels, having a total of about 2 megapixels, resulting in an overall imaging sensor width and length of 3 microns in each dimension. In still further implementations, the lens assembly 120 is configured to capture images with a modulation transfer function of 40% at 160 line pairs per millimeter. The lens assembly 120 may also be disposed in the imaging system 110 so as to avoid physical contact between the fourth lens 128 of the lens assembly 120 and the imaging sensor 112.

Figure 4:
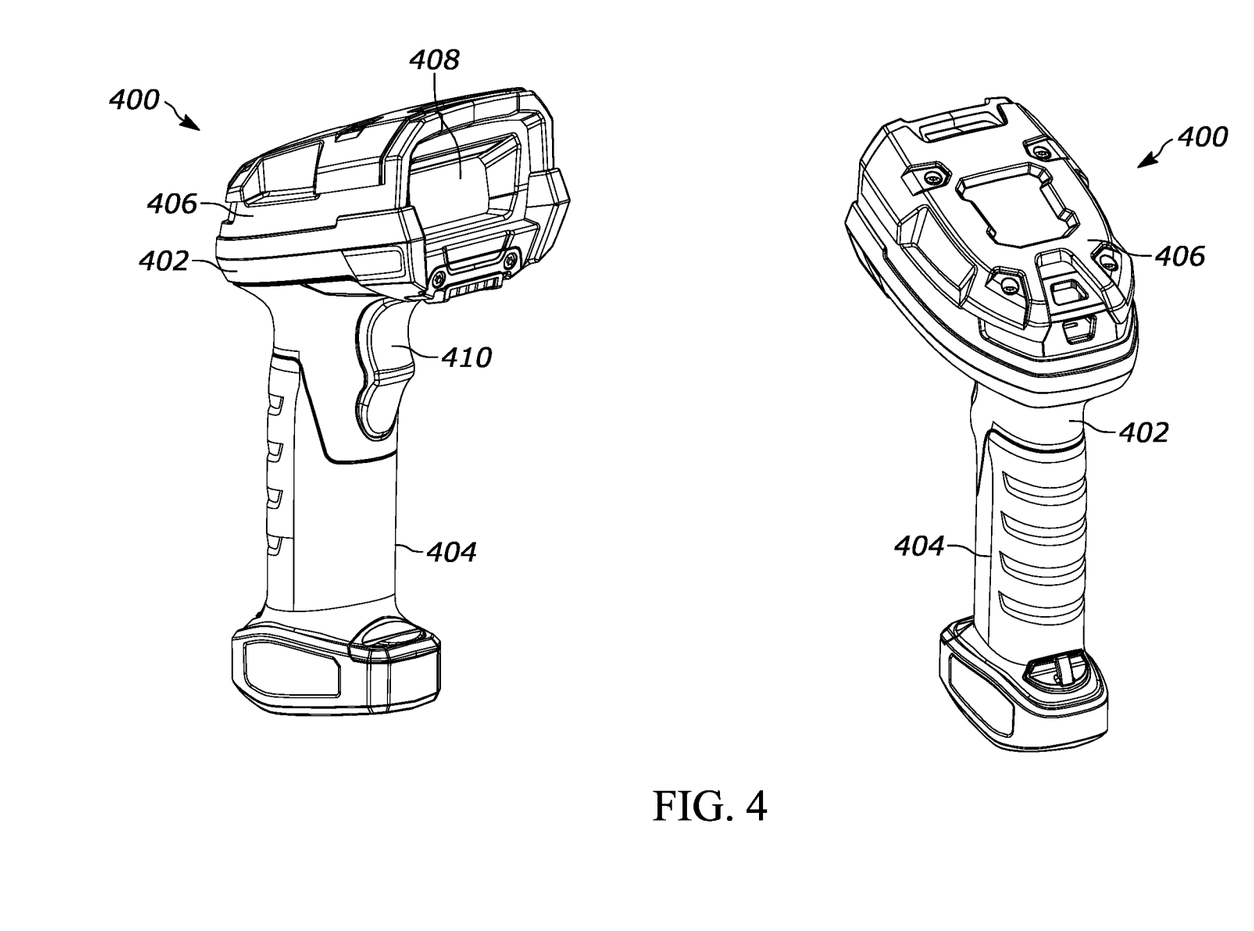
FIG. 4 illustrates a perspective front and back view of an optical imaging reader in accordance with an embodiment.
Figure 5:
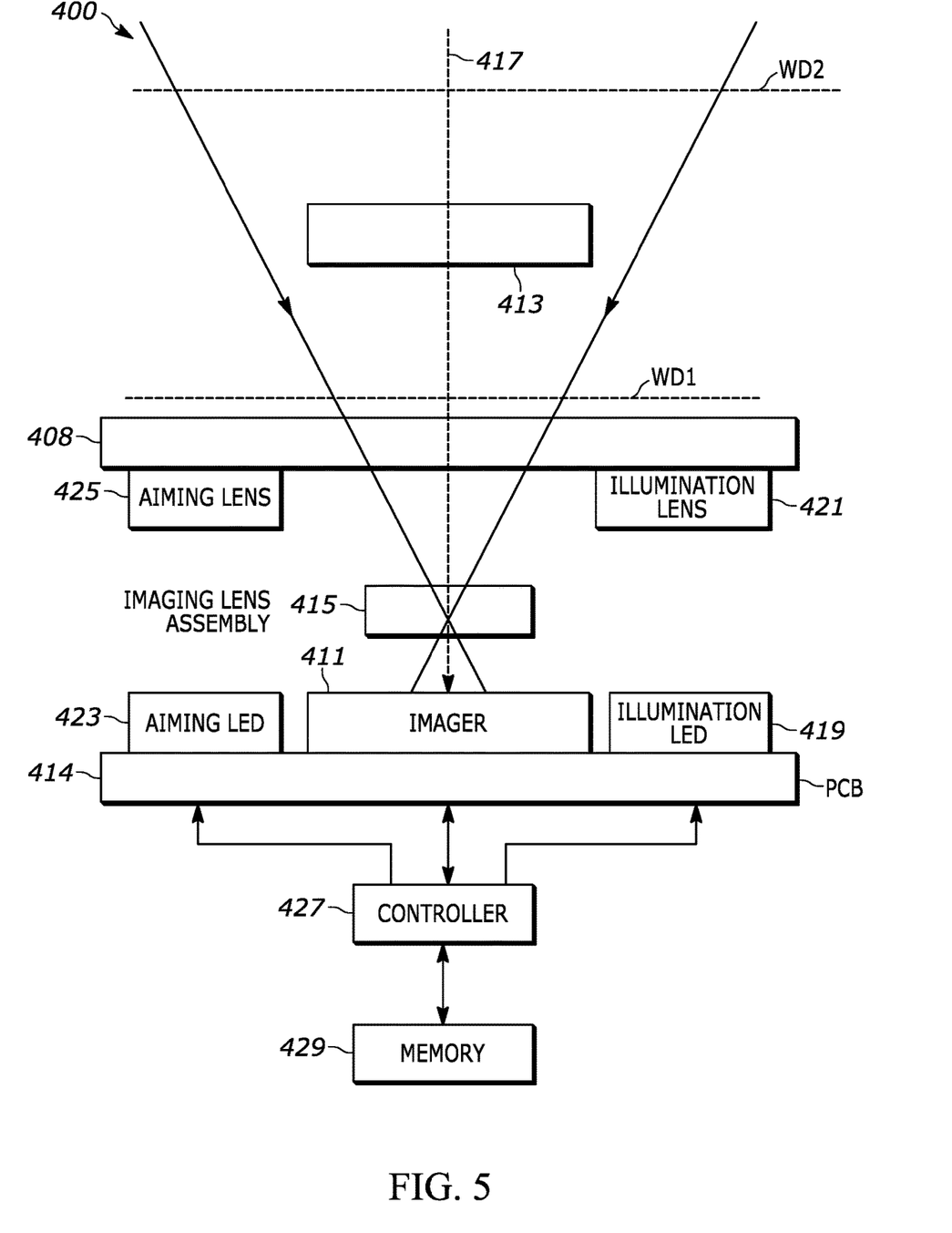
FIG. 5 illustrates a schematic block diagram of various components of the reader of FIG. 1 in accordance an embodiment.

The above-identified imaging engine device 100 can be implemented in the barcode reader of FIGS. 4 and 5. FIGS. 4 and 5 are exemplary embodiments of an optical imaging reader 400 (also referred to as a barcode reader) and the components thereof. However, it will be understood that the above-identified imaging engine is not exclusively implemented in barcode readers 400, and is instead able to be implemented in any such device employing an image assembly with a field-of-view (FOV). With more specific reference to barcode readers, it will be further understood that, although a particular embodiment of a barcode reader 400 is disclosed, this disclosure is applicable to a variety of barcode readers, including, but not limited to, gun-type handheld readers, mobile computer-type readers, presentation readers, etc.

Referring now to the drawings, FIG. 4 illustrates an exemplary barcode reader 400 having a housing 402 with a handle portion 404, also referred to as a handle 404, and a head portion 406, also referred to as a scanning head 406. The head portion 406 includes a window 408, and is configured to be positioned on the top of the handle portion 404. In some implementations, the window 408 may be the front aperture 114 of the imaging engine device 100. The handle portion 404 is configured to be gripped by a reader user (not shown) and includes a trigger 410 for activation by the user. Optionally included in an embodiment is a base (not shown), also referred to as a base portion, that may be attached to the handle portion 404 opposite the head portion 406, and is configured to stand on a surface and support the housing 402 in a generally upright position. The barcode reader 400 can be used in a hands-free mode as a stationary workstation when it is placed on a countertop or other workstation surface. The barcode reader 400 can also be used in a handheld mode when it is picked up off the countertop or base station, and held in an operator's hand. In the hands-free mode, products can be slid, swiped past, or presented to the window 408 for the reader to initiate barcode reading operations. In the handheld mode, the barcode reader 400 can be moved towards a barcode on a product, and the trigger 410 can be manually depressed to initiate imaging of the barcode.

Other implementations may provide only handheld or only hands-free configurations. In the embodiment of FIG. 4, the reader 400 is ergonomically configured for a user's hand as a gun-shaped housing 402, though other configurations may be utilized as understood by those of ordinary skill in the art. As shown, the lower handle 404 extends below and rearwardly away from the body 402 along a centroidal axis obliquely angled relative to a central FOV axis of a FOV of an imaging assembly within the scanning head 402.

For at least some of the reader embodiments, an imaging assembly includes a light-detecting sensor or imager 411 operatively coupled to, or mounted on, a printed circuit board (PCB) 414 in the reader 400 as shown in FIG. 5. Depending on the implementation, the imaging assembly may be or may include imaging system 110. Similarly the PCB 414 may be the PCB 106 of the imaging engine device 100. In an embodiment, the imager 411 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 415 over a field of view along an imaging axis 417 through the window 408. In some implementations, the imaging lens assembly 415 includes or is the telephoto lens assembly 120. Similarly, in some implementations, the imager 411 is the imager 112. The return light is scattered and/or reflected from a target 413 over the field of view. The imaging lens assembly 415 is operative for focusing the return light onto the array of image sensors to enable the target 413 to be read. In particular, the light that impinges on the pixels is sensed and the output of those pixels produce image data that is associated with the environment that appears within the FOV (which can include the target 413). This image data is typically processed by a controller (usually by being sent to a decoder) which identifies and decodes decodable indicial captured in the image data. Once the decode is performed successfully, the reader can signal a successful "read" of the target 413 (e.g., a barcode). The target 413 may be located anywhere in a working range of distances between a close-in working distance (WD1) and a far-out working distance (WD2). In an embodiment, WD1 is about one-half inch from the window 408, and WD2 is about thirty inches from the window 408.

An illuminating light assembly may also be mounted in the imaging reader 400. The illuminating light assembly includes an illumination light source, such as at least one light emitting diode (LED) 419 and at least one illumination lens 421, and preferably a plurality of illumination LEDs and illumination lenses, configured to generate a substantially uniform distributed illumination pattern of illumination light on and along the target 413 to be read by image capture. At least part of the scattered and/or reflected return light is derived from the illumination pattern of light on and along the target 413.

An aiming light assembly may also be mounted in the imaging reader 400 and preferably includes an aiming light source 423, e.g., one or more aiming LEDs or laser light sources, and an aiming lens 425 for generating and directing a visible aiming light beam away from the reader 400 onto the target 413 in the direction of the FOV of the imager 411.

Further, the imager 411, the illumination source 419, and the aiming source 423 are operatively connected to a controller or programmed microprocessor 427 operative for controlling the operation of these components. A memory 429 is connected and accessible to the controller 427. Preferably, the microprocessor 427 is the same as the one used for processing the captured return light from the illuminated target 413 to obtain data related to the target 413. Though not shown, additional optical elements, such as collimators, lenses, apertures, compartment walls, etc. are provided in the head portion 406 of the housing. Although FIG. 5 shows the imager 411, the illumination source 419, and the aiming source 423 as being mounted on the same PCB 414, it should be understood that different embodiments of the reader 400 may have these components each on a separate PCB, or in different combinations on separate PCBs. For example, in an embodiment of the reader, the illumination LED source is provided as an off-axis illumination (i.e., has a central illumination axis that is not parallel to the central FOV axis).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An imaging engine for decoding barcodes, the imaging engine comprising an imager and a telephoto lens assembly for long range imaging of a barcode via the imaging engine, the telephoto lens assembly including:
    a first lens, disposed along an optical axis to receive light from an object of interest;
    a second lens, disposed along the optical axis to receive light from the first lens and further to correct for pupil aberration of the image projected after a fourth lens onto the imager;
    a third lens, disposed along the optical axis to receive light from the second lens and further to correct for chromatic aberration of the image projected after the fourth lens onto the imager, wherein the chromatic aberration is introduced by the first lens; and
    the fourth lens, disposed along the optical axis to receive light from the third lens and further to correct for optical field curvature of the image projected after the fourth lens onto the imager.

2. The imaging engine of claim 1, wherein the first lens and the third lens are singlet glass lenses and the second lens and the fourth lens are singlet plastic lenses.

3. The imaging engine of claim 2, wherein the first lens is formed of a Crown type glass having positive optical power, and wherein the third lens is formed of a Flint type glass having negative optical power.

4. The imaging engine of claim 2, wherein the second lens is a Flint type plastic lens, the fourth lens is a Crown type plastic lens, and the second lens and the fourth lens are aspheric lenses, further wherein the second lens has a first aspheric surface along the optical axis and a second aspheric surface opposite the first aspheric surface disposed along the optical axis, and further wherein the fourth lens has a first aspheric surface along the optical axis and a second aspheric surface opposite the first aspheric surface disposed along the optical axis.

5. The imaging engine of claim 1, wherein the telephoto lens assembly further comprises an aperture stop disposed along the optical axis and between the first lens and the second lens.

6. The imaging engine of claim 1, wherein the telephoto lens assembly further comprises a light collecting aperture disposed along the optical axis of at least 1.5 millimeters.

7. The imaging engine of claim 1, wherein the telephoto lens assembly has an effective focal length (EFL) of at least 11 millimeters.

8. The imaging engine of claim 1, wherein total length from the first lens to the imager is less than or equal to 11 millimeters, and further wherein each of the first lens, the second lens, the third lens, and the fourth lens has a central thickness of at least 1 millimeter.

9. The imaging engine of claim 1, wherein the telephoto lens assembly is mounted on a robotic arm with multiple degrees of freedom.

10. The imaging engine of claim 1, wherein the telephoto lens assembly is configured so as to avoid contact between the fourth lens and the imager.

11. An imaging engine for decoding barcodes, the imaging engine comprising an imager and a telephoto lens assembly for long range imaging of a barcode via the imaging engine, the telephoto lens assembly including:

a first lens, disposed along an optical axis to receive light from an object of interest;

a second lens, disposed along the optical axis to receive light from the first lens and further to correct for pupil aberrations of the image projected after a fourth lens onto the imager;

a third lens, disposed along the optical axis to receive light from the second lens and further to correct for chromatic aberration of the image projected after the fourth lens onto the imager, wherein the chromatic aberration is introduced by the first lens; and the fourth lens, disposed along the optical axis to receive light from the third lens and further to correct for optical field curvature of the image projected after the fourth lens onto the imager;

wherein no elements that modify the light wavefront are disposed between any of the first lens and the second lens, the second lens and the third lens, or the third lens and the fourth lens.

12. The imaging engine of claim 11, wherein the first lens and the third lens are singlet glass lenses and the second lens and the fourth lens are singlet plastic lenses.

13. The imaging engine of claim 12, wherein the first lens is formed of a Crown type glass having positive optical power, and wherein the third lens is formed of a Flint type glass having negative optical power.

14. The imaging engine of claim 12, wherein the second lens is a Flint type plastic lens, the fourth lens is a Crown type plastic lens, and the second lens and the fourth lens are aspheric lenses, further wherein the second lens has a first aspheric surface along the optical axis and a second aspheric surface opposite the first aspheric surface disposed along the optical axis, and further wherein the fourth lens has a first aspheric surface along the optical axis and a second aspheric surface opposite the first aspheric surface disposed along the optical axis.

15. The imaging engine of claim 11, wherein the telephoto lens assembly further comprises an aperture stop disposed along the optical axis and between the first lens and the second lens.

16. The imaging engine of claim 11, wherein the telephoto lens assembly further comprises a light collecting aperture disposed along the optical axis of at least 1.5 millimeters.

17. The imaging engine of claim 11, wherein the telephoto lens assembly has an effective focal length (EFL) of at least 11 millimeters.

18. The imaging engine of claim 11, wherein total length from the first lens to the imager is less than or equal to 11 millimeters, and further wherein each of the first lens, the second lens, the third lens, and the fourth lens has a central thickness of at least 1 millimeter.

19. The imaging engine of claim 11, wherein the telephoto lens assembly is mounted on a robotic arm with multiple degrees of freedom.

20. The imaging engine of claim 11, wherein the telephoto lens assembly is configured so as to avoid contact between the fourth lens and the imager.

* * * * *